United States Patent
Bowen

(10) Patent No.: US 6,244,222 B1
(45) Date of Patent: Jun. 12, 2001

(54) ADJUSTABLE PET COLLARS

(76) Inventor: Els Blok Bowen, 3909 Promontory Pt., Plano, TX (US) 75075

( * ) Notice: Subject to any disclaimer, the term of this patent is extended or adjusted under 35 U.S.C. 154(b) by 0 days.

(21) Appl. No.: 09/310,213

(22) Filed: May 12, 1999

(51) Int. Cl.[7] .................. A01K 27/00; A01K 15/04
(52) U.S. Cl. ............................... 119/856; 119/815
(58) Field of Search ..................... 119/814, 815, 119/856, 865, 821; 602/18

(56) References Cited

U.S. PATENT DOCUMENTS

| | | | |
|---|---|---|---|
| Re. 32,219 | 8/1986 | Garth | 602/18 |
| 3,013,530 | 12/1961 | Zeman | 119/815 |
| 3,036,554 | 5/1962 | Johnson | 119/821 |
| 3,072,098 | 1/1963 | Boemle | 119/821 |
| 4,036,179 | 7/1977 | Turner | 119/815 |
| 4,200,057 | 4/1980 | Agar | 119/815 |
| 4,286,547 | 9/1981 | Nuwbauer | 119/815 |
| 4,476,814 | 10/1984 | Miller | 119/821 |
| 4,719,876 * | 1/1988 | Wilkin | 119/815 |
| 5,012,764 | 5/1991 | Fick et al. | 119/821 |
| 5,133,295 | 7/1992 | Lippincott | 119/815 |
| 5,307,764 | 5/1994 | Moy | 119/815 |
| 5,469,814 | 11/1995 | Moy | 119/815 |
| 5,628,283 * | 5/1997 | Huegelmeyer | 119/815 |
| 5,778,828 * | 7/1998 | Klinkhart et al. | 119/815 |
| 5,797,354 | 8/1998 | Marschall | 119/815 |
| 5,797,863 | 8/1998 | K.o Slashed Hnke | 602/18 |
| 6,056,711 * | 5/2000 | Domanski et al. | 602/18 |

FOREIGN PATENT DOCUMENTS

| 4100851 | 7/1991 | (DE) . |
|---|---|---|
| 2630297 | 10/1989 | (FR) . |

* cited by examiner

*Primary Examiner*—Charles T. Jordan
*Assistant Examiner*—Elizabeth Shaw

(57) ABSTRACT

An adjustable pet collar comprised of a flexible UV safe foam (18) shaped as a cylinder with a vertical slit (14). The closure consists of one or more self-adhesive loop strap (12) attached around the center of the collar with one end overlapping. The hook strap (16) is attached to the overlapping side of the self-adhesive side loop strap (12). The collar may contain one or two Velcro strips attached to the collar. A single Velcro strap is used for smaller animals while the double strap is used for large animals.

1 Claim, 1 Drawing Sheet

ADJUSTABLE PET COLLARS

BACKGROUND—FIELD OF INVENTION

This invention relates to the prevention of animals from self-mutilation due to external injuries from external causes or self-inflicted injuries.

BACKGROUND—DESCRIPTION OF PRIOR ART

Currently, veterinarians and pet suppliers use an Elizabethan style animal collars to stop an animal from self mutilation. When a pet has been injured and requires medical attention or had some type of surgery an Elizabethan style animal collar is used to stop a pet from irritating the afflicted area. The Elizabethan style collar is cumbersome because the plastic design is not flexible. It is a distraction for the animal because it is formed to go around the neck and flare away from the head of the animal, which causes their peripheral vision to be distorted. The animals are not aware of how far it extends out and can not judge the distance from other objects and themselves. This in turn frightens and confuses the animal and daily routines become very frustrating for the animal. The animals can not eat, drink or sleep properly because it interferes their daily activities and routines.

Inventors have created several types of collars that are not comfortable for the pet. U.S. Pat. No. RE32,219 to Garth (1986) discloses a stiff elongated band that is made of a flexible material from various plastics.

U.S. Pat. No. 3,013,530 to Zeman (1961) displays a collar that provides a large space around the neck with numerous strings attached making the collar more difficult to adjust.

U.S. Pat. No. 3,027,894 to Moore (1962) displays a cervical collar constructed from heavy strap like materials such as leather that often includes multiple metal braces.

U.S. Pat. No. 3,036,554 to F. L. Johnson (1962) displays a collar for a dog assembled with laces or staples.

U.S. Pat. No. 3,072,098 to Boemle (1963) displays a collar assembled by means of loose parts, in the form of a strip, with two u-bends attached to the collar by two staples.

U.S. Pat. No. 4,036,179 to Turner (1977) and U.S. Pat. No. 4,286,547 to Nuwbauer (1981) are body trusses, which inhibits the animals daily routines.

U.S. Pat. Nos. 5,307,764 and 5,469,814 to Moy (1994–1995) is made of a flexible sheet of material which is fastened around the neck to prevent the animal from biting or licking the wound.

U.S. Pat. No. 4,476,814 to Miller (1984) is an animal pet medical collar made with resilient foam having a doughnut shape using drawstrings anchored to each end of the body.

U.S. Pat. Nos. 4,200,057 and 5,012,764 to Fick et al. (1991) describes a collar that is assembled with fasteners in the form of loops and hooks that are fastened to the overlapping ends of the collar.

U.S. Pat. No. 5,133,295 to Lippincott (1992) describes a veterinary collar for a cat comprising of two side-by-side rings sewn together with a drawstring passage. These rings are made of plastic sheet material, and gathered to form radial pleats.

U.S. Pat. No. 5,797,863 to K.o slashed.hnke (1996) discloses a collapsible cervical collar with an elongated neck and a brace for chin support.

DE 4,100,851 to DE. (1991) describes a collar assembled with snap fasteners.

FR 2,630,297 to FR.(1989) describes a collar that has two tongues on opposite sides that hook together. A similar U.S. patent is U.S. Pat. No. 5,797,354 to Marschall (1996).

Products that are currently on the market are "Your Pet's Recovery and Protection Collar" manufactured by 3M and "Space Age Plastic Collar" by Avian Medical Center. The collars inhibit the animal from engaging in their daily activities.

Objectives and Advantages

The advantages of the present animal collars are as follows:

(a) to provide a closure that can allow any person to position the brace on or off with ease.

(b) to provide easy modifications that can be altered to meet the specific neck diameter and length of the animal.

(c) to provide the caregiver of the animal easy access to apply topical medications/bandages to the injured area without fear of being bitten by the animal or having the animal lick or bite it off.

(d) to provide time for the animals wound to heal without inducing secondary trauma (e) to provide the animal the freedom to go about daily activities without being distracted.

(f) to provide the animal with little discomfort (g) to provide time for the animals wound to heal by inhibiting the animal to lick or bit the afflicted area.

(h) to provide a weather proof lightweight, reusable collar that does not affect mobility.

(i) to provide a softer and more flexible product which is produced in a variety of colors.

DRAWING FIGURES

REFERENCE NUMERALS IN DRAWINGS

Figure 1A:
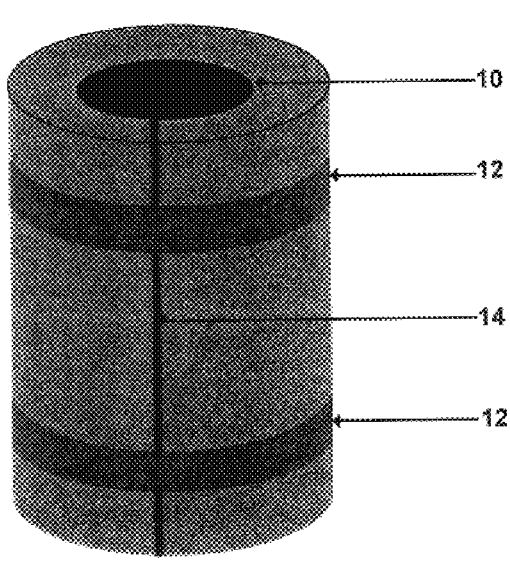
FIG. 1A Shows the side view of the adjustable animal collar with an elongated slit and two hook and loop straps.

10 Opening for animals neck
12 Self adhesive loop strap
14 Slit in foam
16 Self adhesive hook strap
18 Foam

SUMMARY

This collar compromises a cylindrical shape and is made with UV safe, foam insulation utilizing a strip of hook and loop wrapped around the middle of the collar for easy fastening. For larger animals 2 hook and loop straps are used. The first hook and loop strap is wrapped around the top of the collar and the second hook and loop strip is secured around the bottom section of the collar.

Figure 1B:
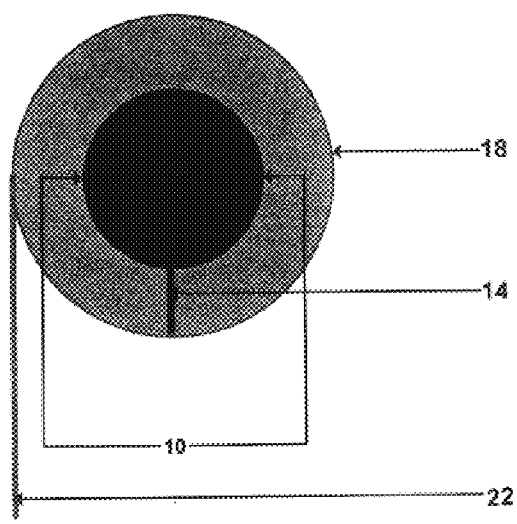
FIG. 1B Shows the top view with hole, slit, and over lapping hook and loop strap.
Figure 2A:
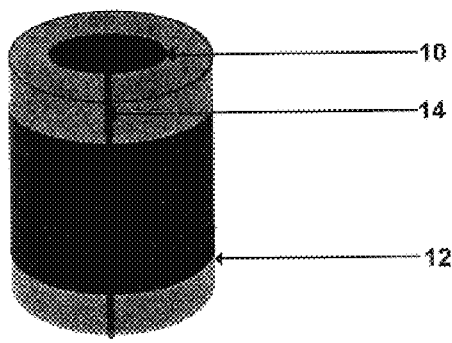
FIG. 2A Shows side view of the adjustable animal collar with an elongated slit and one hook and loop strap.
Figure 2B:
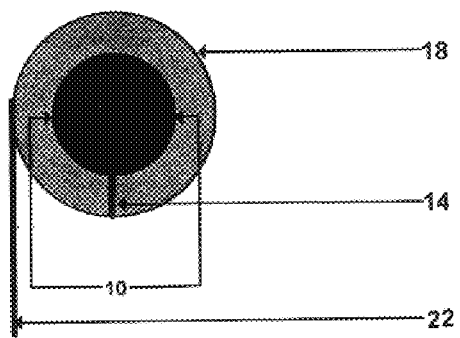
FIG. 2B shows the top view with hole, slit and one overlapping hook and loop strap.

Description—FIGS. 1 and 2

A typical embodiment of the present invention is illustrated in FIG. 1A (side view) and FIG. 1B (top view). The collar is made of flexible foam 18 that can be altered to accommodate the size of the animal's neck. A strip of self adhesive hook strap 12 is wrapped around the middle of the collar surpassing the slit in foam 14 by three inches (as to form a tail). Second piece of loop strap 16 is adhered to the backside of these two strips and is identical in length. The Velcro has been added for adjusting the collar and securing it around the animal's neck.

The collar for smaller animals such as birds is typically 1 to 1.5 cm in thickness and has overall dimensions roughly from 4 cm in diameter and 5.5 cm (cylinder shape) 18. The opening is 3 to 5 cm (oval shape) 10 depending on the snugness needed around the neck. The hook strap 12 is 23 to 25 cm long and 2.5 cm wide and is applied even with the center edge of the collar 18. There will 8 cm of excess on the opposite end of the collar to allow for the opposite side, also 8×2.5 cm of the Velcro loop strap to be added 16. This enables the collar to stay in place. Animals that are of a medium size such as cats or small dogs is typically 2 cm in thickness and has an overall dimension from 7 cm in diameter and 9 cm in height (cylinder shape) 18. The opening is 8 to 14 cm (oval shape) 10 depending on the snugness needed around the neck. Generally a 0.5 cm of free play is sufficient. The Velcro hook strap 12 that is used for this size is 5×10 to 12 cm.

Animals that are of a large size such as large dogs is typically 2 cm in thickness and has an overall dimension from 14.5×10 cm (cylinder shape) 18. The opening is 11 to 17 cm (oval shape) 10 depending on how snug you want to make it around the neck. The hook and loop strap or straps used for this size is 5×10 to 12 cm.

Operation—FIGS. 1 and 2

The manner of using this collar is to place the collar around the animal's neck with the opening facing the backside of the animal. Take the hook strap and attach it to the other side of the collar adjusting according to neck size. To allow adequate movement for breathing, eating and ventilation place one finger between the animal's neck and adjustable collar.

To remove collar, lift hook strap and remove collar from animal.

Conclusion, Ramifications, and Scope

This animal collar can be easily used. It can be removed just as easily as placed on the animal without any undue harm to the animal or the collar. The production of this collar is made in a variety of colors without requiring the manufacturer to use a separate facility. The collar is soft, pliable to avoid any additional harm to the animal. The collar is also weatherproof, UV safe, reusable and hand washable without hindering the effectiveness of the collar.

it permits the animals wound to heal because the animal cannot access the wound.

it permits the animal to eat, drink and go on with its daily activities without interference.

it permits the animal to have a healthy attitude by not feeling self-conscious.

The description above includes numerous specifications. These specifications simply outline some of the current designs of the invention. They should not be seen as restrictions. For example, the collar could be made even smaller. The hook and loop strap could be wider or have multiple straps added to the collar depending on the size of the animal. Labels with name, address, city, state, and phone number could be added. Physical appearance could be altered by adding rhinestones, bobbles etc. for strictly cosmetic features.

What is claimed is:

1. An adjustable collar capable of wrapping around an animal's neck to prevent self-mutilation of an afflicted or injured area comprising:

A piece of foam material having a permanent cylindrical shape and having a hollow opening of a predetermined size capable of fitting about the neck of the animal;

Said foam material having a vertical slit extending the length of the cylindrical shape to expose the hollow opening, the foam material being flexible enough to be partially deformed in order to lift the neck of an animal through the vertical slit into the hollow opening;

Means for securing the foam material in place being at least one strap of book and loop fasteners extending perpendicularly across the vertical slit.

* * * * *